UNITED STATES PATENT OFFICE.

JOHANN P. SIEVEKING, OF ALTONA, PRUSSIA.

IMPROVEMENT IN TREATING QUICKSILVER-ORE.

Specification forming part of Letters Patent No. 169,198, dated October 26, 1875; application filed March 11, 1875.

*To all whom it may concern:*

Be it known that I, Dr. JOHANN P. SIEVEKING, of Altona, in the Duchy of Holstein and Kingdom of Prussia, have invented Improvements in Treating Quicksilver-Ore; and I do hereby declare the following description and accompanying drawings are sufficient to enable any person skilled in the art or science to which it most nearly appertains to make and use my said invention without further invention or experiment.

My invention consists in subjecting quicksilver-ores in which sulphur in a free state is contained to a preliminary treatment for the purpose of eliminating the sulphur before roasting the ore, thus recovering the sulphur in a marketable condition.

My process for the elimination of the sulphur is as follows:

The raw ores, reduced to the size of a walnut, more or less, I first subject to the action of bisulphide of carbon at a temperature of about 130° Fahrenheit, in a closed iron vessel, said process being carried on for the necessary length of time to allow all the free sulphur contained in the ore to be dissolved. As soon as this has been accomplished the heat is increased a little, so as to procure a stronger pressure in the vessel, and then the fluid is passed through a filter at the bottom of the vessel, and allowed to pass out through an iron pipe into a second closed and warmed iron settling-vessel, where it remains until all the fine dust carried mechanically with the solution has completely settled. This being obtained, the solution is passed into closed cool iron crystallization-pans, where most of the sulphur will crystallize, the fluid remaining being carried into a reservoir, to be pumped into the first vessel and used again for the same process.

The crystallized sulphur thus obtained will be in a marketable condition.

After this process has been completed the quicksilver-ore from which the sulphur has been eliminated is subjected to the roasting process, in the usual way, to vaporize the quicksilver and condense the resulting fumes.

Having thus described my invention, what I claim, and desire to secure by Letters Patent, is—

The process of extracting free sulphur from quicksilver-ores by subjecting the ore to a preliminary process, substantially as above described, viz., treating the crushed ore with bisulphide of carbon in a closed vessel at a temperature of about 130° Fahrenheit, for the purpose of removing the sulphur in a marketable condition, before heating the ore to vaporize the quicksilver.

DR. JOHANN PETER SIEVEKING.

Witnesses:
   JNO. L. BOONE,
   C. M. RICHARDSON.